United States Patent [19]

Dear et al.

[11] 3,907,576

[45] Sept. 23, 1975

[54] COMPOSITIONS CONTAINING WERNER COMPLEXES OF CHROMIUM AND FLUORINATED CARBOXYLIC ACIDS

[75] Inventors: Robert E. Dear, Mount Kisco, N.Y.; Jai Prakash Tandon, Cranston, R.I.

[73] Assignee: Ciba-Geigy Corporation, Ardsley, N.Y.

[22] Filed: Feb. 22, 1972

[21] Appl. No.: 228,395

[52] U.S. Cl.............. 106/2; 106/13; 260/438.5 C
[51] Int. Cl.²........................................ C09K 3/18
[58] Field of Search............ 106/13, 2; 260/438.5 C, 260/438.5 R

[56] References Cited
UNITED STATES PATENTS
3,287,141   11/1966   Bartz.................................. 106/13

FOREIGN PATENTS OR APPLICATIONS
970,494   9/1964   United Kingdom.......... 260/438.5 C

*Primary Examiner*—Lorenzo B. Hayes
*Attorney, Agent, or Firm*—Joseph G. Kolodny; Edward McC. Roberts; Prabodh I. Almaula

[57] ABSTRACT

Oil and water repellent compositions containing Werner complexes formed from trivalent chromium and a mixture of fluorinated acids of the type $R_fCOOH$ and $R_fCH_2COOH$.

5 Claims, No Drawings

COMPOSITIONS CONTAINING WERNER COMPLEXES OF CHROMIUM AND FLUORINATED CARBOXYLIC ACIDS

The present invention is directed to a composition suitable for providing oil and water repellency for substrate materials. Particularly desirable surface for treatment are paper and leather.

More specifically the present disclosure concerns a composition containing separate Werner complexes formed from chromium and fluorinated carboxylic acids.

The use of specific fluorinated carboxylic acids to form a Werner complex with trivalent chromium is known in the prior art. Illustratively Reid, U.S. Pat. No. 2,662,835 and LaFleur U.S. Pat. No. 2,904,571 both disclose the initial utilization of a fluorinated acid of the formula $C_nF_{2n+1}COOH$ in formation of a chromium complex.

In the present composition which is suitable for imparting oil and water repellency, two separate fluorinated carboxylic acid types are used as source materials. An advantage of the present invention is that physical separation of the acid mixture need not take place prior to formation of the Werner complex.

The present invention employs the Werner complex formed from trivalent chromium and a fluorinated carboxylic acid of the formula $R_fCOOH$ as disclosed in U.S. Pat. Nos. 2,662,835 and 2,904,571. As employed herein, $R_f$ is a perfluoroalkyl group either straight or branched containing 3 to 18 carbon atoms. For maximum efficiency a straight chain $R_f$ group is preferable. Most desirably this fluorinated constituent will contain from 6 to 12 carbon atoms.

Also in the composition of this disclosure an additional chromium complex is employed utilizing a starting acid of the formula type $R_fCH_2COOH$, with $R_f$ as defined; namely, a straight or branched chain containing 3 to 18 carbon atoms in the fluorinated group.

In comparison of chromium complexes prepared from acids of the type $R_fCOOH$ as opposed to the acid type $R_fCH_2COOH$, the complex from $R_fCOOH$-chromium is clearly superior at equivalent fluorine contents in providing oil and soil repellency. Thus this Werner complex is clearly more efficient in providing the desired degree of oil or water repellency.

However, it has been unexpectedly discovered that a mixture of chromium complexes from these two separate acids, namely, $R_fCOOH$ and $R_fCH_2COOH$ gives results which are essentially similar as a more preferred chromium complex formed from $R_fCOOH$. This comparison holds true on the basis of equal fluorine contents on the substrate.

As previously mentioned a mixture of acids of the type $R_fCOOH$ and $R_fCH_2COOH$ can be utilized in conjunction with one another in forming a mixture of Werner complexes. In such a case these acids can be prepared in the presence of one another and no physical separation procedures need take place prior to preparation of the desired complexes.

The chromium complexes using a starting fluorinated carboxylic acid of the type $R_fCOOH$ are well known in the art such as evidenced by Reid, U.S. Pat. No. 2,662,835.

The second starting acid of the type $R_fCH_2COOH$ is known in the prior art and a suitable method of preparation is disclosed in J. Org. Chem. 23, 1166 (1958).

The starting fluorinated acids may be formed from byproducts which arise from esterification of $R_fCH_2CH_2I$ with an acid in the presence of a base. Separation of the ester will leave an olefin byproduct of the formula $R_fCH=CH_2$ which is formed by dehydrohalogenation of the starting iodide. Also present with this olefin will be unseparated esters of the type $R_fCH_2CH_2OCOR$ and starting material $R_fCH_2CH_2I$. Oxidation of these byproducts with the unseparated ester by well known techniques such as use of potassium dichromate (e.g., U.S. Pat. No. 3,525,758) or potassium permanganate will give $R_fCOOH$ from the olefin as well as $R_fCH_2COOH$ from the unseparated ester and $R_fCH_2CH_2I$ starting material.

The preparation of the Werner complexes from trivalent chromium and the disclosed combination of fluorinated carboxylic acids involves known techniques such as disclosed in Reid U.S. Pat. No. 2,662,835. The preparation of a Werner complex involving the use of a fluorinated carboxylic acid and chromium is well documented in the prior art and similar methods may be utilized. Illustratively, chromyl chloride may be reduced with an alcohol followed by reaction of the chromic compound with the fluorinated carboxylic acid.

A second method of preparation involves a hydrolysis of chromium chloride hexahydride with a basic hydroxide such as sodium hydroxide followed by a reaction of the chromium salt with the fluorinated carboxylic acid. This general method of preparation is described in U.S. Pat. No. 3,351,663. Other less desirable methods are described in U.S. Pat. No. 2,909,545.

The present composition containing a mixture of Werner complexes to provide oil and water repellency to a substrate will be formed from acids of the types $R_fCOOH$ and $R_fCH_2COOH$. The proportions of $R_fCOOH$ to $R_fCH_2COOH$ to form the Werner complex may vary over wide ranges such as from 10 to 99 parts by weight of $R_fCOOH$ to 90 to 1 part by weight $R_fCH_2COOH$. More desirably the $R_fCOOH$-chromium complex will be present in a major proportion in comparison with the $R_fCH_2COOH$-chromium complex. Most desirably the $R_fCH_2COOH$-complex will not be present at more than 1 part by weight to 4 parts by weight on the basis of the acid type $R_fCOOH$.

The chromium content may vary over wide ratios although generally the ratio will be between 2:1 and 12:1 chromium to acid (mole ratio). At a ratio of less than 2:1, precipitation occurs if the concentrated complex solution is diluted. At high chromium contents, the complexes will perform effectively but high loadings are required to obtain comparable results. A most preferred ratio of chromium to acid is between 2:1 and 4:1.

The type of substrate material to which the complexes are applied is not critical, although paper and leather are preferred substrates. Coatings may be applied to various surfaces such as textiles, leather, paper, wood, masonry, metal, plastics, glass, painted surfaces and the like. These coatings may be readily applied by various coating techniques such as dipping, spraying, brushing, padding, roller coating and the like.

For the purposes of evaluation of the disclosed compositions, repellency ratings for both oil and water were determined on a filter paper substrate made from 50 percent sulfite pulp and 50 percent rag. In the present examples involved, the repellency ratings were determined as follows:

For oil resistance (Kit Test) TAPPI Routine Control Test, RC No. 338 was employed. Briefly this test utilizes 12 solutions of various proportions of castor oil, toluene and heptane. The solutions are numbered from 1 to 12 in descending order as the amount of castor oil is decreased. A Kit value represents the highest number solution to stay on the paper surface for 15 seconds in the form of a drop without surface penetration. A high number denotes superior oil resistance.

Water repellency is determined by TAPPI (Technical Association of the Pulp and Paper Industry) No. 441-OS-69 issued Dec. 1, 1969, and is known as the Cobb Size Test. Briefly this test is on the basis of water absorbed based on an area of one hundred square centimeters of the paper substrate. Low numerical values denote superior repellency.

The following examples describe the various innovative aspects of the present invention.

EXAMPLE 1

2-Perfluoroalkyl ethyl iodide (800 g; 1.43 moles) ($R_f$ equals $C_6F_{13}$ 27.1 percent, $C_8F_{17}$ 59.4 percent and $C_{10}F_{21}$ 12.2 percent), cadmium oxide (184 g; 1.43 mole) and acetic acid (2700 ml) were added to a stainless steel autoclave of 1 gallon capacity and heated with stirring to 180° for 19 hrs. The reactor was cooled and the crude product washed with water. The organic layer was separated, dissolved in chloroform and washed with dilute sodium bicarbonate solution to remove all traces of acid. Distillation of the chloroform layer afforded a forerun of perfluoroalkyl ethylene ($R_fCH=CH_2$) (47.8 g; 7.8 percent yld) boiling 95°/760 mm to 77°/110 mm Hg., followed by perfluoroalkyl ethyl acetate (570.9 g; 81.2 percent yld), boiling 72°/50 mm–90°/7 mm.

EXAMPLE 2

Potassium permanganate (112.5 g), tertiary-butanol (100 g) and water (70 g) were stirred and a distilled mixture comprising 2-perfluoroalkyl ethylene and perfluoroalkyl ethyl acetate was added at a rate sufficient to maintain the temperature below 70°. Stirring continued at a temperature of 70°C for 30 minutes. The mixture was heated slowly to reflux temperature and was held at this temperature for 3 hrs. with continuous stirring. At the end of this time, denatured ethanol (5 g, 0.1 mole) was added at a rate sufficient to maintain constant reflux. The mixture was then diluted with water (250 g at 60°C), filtered and the filter residue was washed with water (125 g at 60°C). The filter residue was discarded while the filtrate and water wash were combined and acidified with 37 percent hydrochloric acid (80 g, 0.80 mole). After standing for 1 hr., the lower fluorocarbon phase was separated and washed with 50 g of water. The crude fluorocarbon acid phase was stripped under reduced pressure at 60°C and 25 mm Hg to remove tertiary-butanol and water to give perfluoroalkanoic acids (57 g, $R_fCOOH$: $C_6F_{13}$=2.3 percent, $C_8F_{17}$=41.6 percent, $C_{10}F_{21}$=31.7 percent, $C_{12}F_{25}$=1.5 percent, $R_fCH_2COOH$: $C_6F_{13}$=0.1 percent, $C_8F_{17}$=7.1 percent, $C_{10}F_{21}$=4.9 percent).

EXAMPLE 3

A 250 ml creased flask, with three necks, was fitted with a mechanical stirrer, condenser with drying tube, addition funnel, nitrogen inlet and a thermometer extending below the liquid surface. The composition in Example 2 (25.4 g; 0.05 mole) was dissolved in 75 ml dry isopropanol (dried over molecular sieves) and added to the flask. Chromyl chloride (25.0 g; 0.161 mole) was dissolved in carbon tetrachloride (70 ml) and placed in the addition funnel (this solution must be mixed thoroughly, otherwise the $CrO_2Cl_2$ will tend to form a lower layer) and then added slowly, with stirring. The rate of addition was adjusted so that the exothermic reaction maintained the temperature between 40°C and 60°C. Then the system was refluxed and stirred for one hour. After cooling, any solid impurities were removed by filtration and the carbon tetrachloride was taken off on the rotary evaporator. The solution was adjusted to 30 percent solids with isopropanol and 1 ml water was added as a stabilizer.

This procedure involves a 3:1 ratio of chromium compound to acid.

EXAMPLES 4 to 8

A 250 ml three-necked creased flask is fitted with a mechanical stirrer, a condenser and a dropping funnel. Chromium chloride hexahydrate ($CrCl_3$, $6H_2O$) (34 g; 0.128 mole) is dissolved in 50 ml. isopropanol in the flask and a solution of sodium hydroxide (5.2 g; 0.130 mole) is prepared in 30 g methanol. With rapid stirring, the alcoholic base is added to the isopropanol solution of $CrCl_3 6H_2O$. A precipitate of sodium chloride forms and the reaction is completed by heating to reflux temperature for 1 hr. The slurry is cooled and a mixture of fluoro acid (0.04 moles in 10 ml isopropanol) is added slowly, with stirring, at ambient temperatures. This acid mixture comprises $R_fCOOH$ containing $C_6F_{13}$ 5.9 percent, $C_8F_{17}$ 42.2 percent, $C_{10}F_{21}$ 21.6 percent; and $R_fCH_2COOH$ containing $C_6F_{13}CH_2$ 1.1 percent, $C_8F_{17}CH_2$ 6.1 percent $C_{10}F_{21}CH_2$ 5.3 percent. The solution is refluxed briefly, then cooled and filtered. At this stage, the methanol may, if it is so desired, be removed by distillation. The 3:1 complex is then adjusted to 30 percent solids with isopropanol.

In similar fashion using the acid composition previously described, complexes were obtained at chromium to acid ratios of 2:1, 4:1, 5:1 and 6:1 respectively.

| EX. | Acid | $CrCl_3 6H_2O$ | NaOH | Ratio Cr:COOH |
|---|---|---|---|---|
| 5 | 29.7g, 0.05 mole | 26.6g, 0.10 mole | 4.2g, 0.105 mole | 2:1 |
| 6 | 14.82g, 0.025 mole | 26.6g, 0.10 mole | 4.2g, 0.105 mole | 4:1 |
| 7 | 23.7g, 0.04 mole | 53.2g, 0.20 mole | 8.0g, 0.20 mole | 5:1 |
| 8 | 19.8g, 0.033 mole | 53.2g, 0.20 mole | 8.0g, 0.20 mole | 6:1 |

EXAMPLE 9

The procedure of Example 3 was followed except that the acid type $R_fCOOH$ was employed where $R_f=C_6F_{13}$ 23.6 percent, $C_8F_{17}$ 52.1 percent and $C_{10}F_{21}$ 19.4 percent by weight. $R_fCH_2COOH$ was present as an impurity but was present at less than 1% by weight. 22.8 grams (0.05 mole) of $R_fCOOH$ was used while 25.0 g (0.161 mole) of chromyl chloride was employed to give a ratio of Cr to $R_fCOOH$ of 3:1.

EXAMPLE 10

To prepare a $R_fCH_2COOH$ type acid, a mixed alcohol, $R_fCH_2CH_2OH$ (50 g) ($R_f$=20.7 percent $C_6F_{13}$, 44.6 percent $C_8F_{17}$ and 28.9 percent $C_{10}F_{21}$) was added gradually to potassium permanganate (100 g; 6 mole) tertiary butyl alcohol (100 g) and water (75 ml) at a rate such that the temperature of the reactor did not exceed 70°. The mixture was slowly warmed to reflux temperature and held there for 3 hrs. Stirring was maintained throughout. The mixture then was cooled, diluted with water and filtered. The filter residue was washed thoroughly with water and discarded. The filtrate and washings were combined and acidified with concentrated hydrochloric acid, at which time a lower fluorocarbon layer separated. This was separated, washed with water and the t-butyl alcohol was removed by distillation, giving a mixture of 1,1-dihydroperfluoroalkanoic acids, $R_fCH_2COOH$, (30 g) ($R_f$=28.9 percent $C_6F_{13}$, 44.0 percent $C_8F_{17}$ and 26.6 percent $C_{10}F_{21}$).

EXAMPLE 11

In similar fashion as Example 4, a 3:1 chromium complex of $R_fCH_2COOH$ was obtained using $CrCl_3 6H_2O$ (34.0 g; 0.128 mole); NaOH (5.2 g; 0.130 mole) and $R_fCH_2COOH$ (16.5 g; 0.04 mole).

EVALUATION

The chromium complexes of Example 4, Example 9 and Example 11 at ratios of 3:1 chromium to acid were evaluated at varying fluorine contents on paper made from 50 percent bleached sulfite pulp and 50 percent rag. Also to serve as a comparison basis, a commercially obtainable fluorinated carboxylic acid chromium complex was used which is described in No. 121.2518 of the Food Additive Regulations of the FDA. The chromium to acid content is essentially at a mole ratio of 3:1.

The complexes were applied to a paper surface by padding at fluorine weight levels at 0.08, 0.12, 0.16 and 0.20 percent. The resistance to oil was determined in accordance with TAPPI Routine Control Test RC No. 338 and the resistance of the paper to water was determined in accordance with TAPPI, Official Bulletin, No. T 441-OS-69.

The following tables summarize the results obtained:

TABLE 1

Comparative Kit Test (oil resistance)

| Test material | %F owp* | | | | |
|---|---|---|---|---|---|
| | 0.04 | 0.08 | 0.12 | 0.16 | 0.20 |
| 3:1 Cr Complex of $R_fCOOH/R_fCH_2COOH$ mixture[1] | 4 | 7 | 10 | 11 | 12 |
| 3:1 Cr Complex of $R_fCOOH$ mixture | 6 | 9 | 12 | 12 | 12 |
| 3:1 Cr Complex of $R_fCH_2COOH$[3] | 5 | 7 | 8 | 9 | 10 |
| 3:1 Cr Complex No. 121.2518 | 4 | 6 | 6 | 6 | 6 |

Untreated paper gives a Kit Number of 0.
*on weight of paper
[1] mixture of Ex. 4
[2] mixture of Ex. 9
[3] mixture of Ex. 10

TABLE 2

Cobb Size Test (water resistance) (g. water absorbed/100 cm²)

| Test Material | %F owp* | | | |
|---|---|---|---|---|
| | 0.08 | 0.12 | 0.16 | 0.20 |
| 3:1 Cr Complex of $R_fCOOH/R_fCH_2COOH$ mixture[1] | 0.40 | 0.25 | 0.24 | 0.24 |
| 3:1 Cr Complex of $R_fCOOH$ mixture[2] | 0.29 | 0.26 | 0.28 | 0.36 |
| 3:1 Cr Complex of $R_fCH_2COOH$[3] | 0.44 | 0.51 | 0.52 | 0.60 |
| 3:1 Cr Complex 121.2518 | 0.19 | 0.39 | 0.55 | 0.52 |

Untreated paper absorbs 0.7 to 0.8g H₂O/100 cm²
*on weight of paper
[1] mixture of Ex. 4
[2] mixture of Ex. 9
[3] mixture of Ex. 10

TABLE 3

Effect of Chromium to Acid Ratio Variations in $R_fCOOH/R_fCH_2COOH$[1] Complexes; Comparative Kit Test (oil resistance)

| Chromium: Acid Ratio | % F owp* | | | |
|---|---|---|---|---|
| | 0.08 | 0.12 | 0.16 | 0.20 |
| 2:1 | 7 | 10 | 12 | 12 |
| 3:1 | 7 | 10 | 11 | 12 |
| 4:1 | 6 | 8 | 10 | 12 |
| 5:1 | 6 | 9 | 10 | 11 |
| 6:1 | 5 | 6 | 8 | 10 |

*on weight of paper
[1] mixture of Ex. 4

TABLE 4

Effect of Chromium to Acid Ratio Variations in $R_fCOOH/R_fCH_2COOH$[1] Mixtures; Cobb Size Test (water resistance) (g. water absorbed/100 cm²)

| Chromium: Acid Ratio | %F owp* | | | |
|---|---|---|---|---|
| | 0.08 | 0.12 | 0.16 | 0.20 |
| 2:1 | 0.39 | 0.23 | 0.25 | 0.24 |
| 3:1 | 0.40 | 0.25 | 0.24 | 0.24 |
| 4:1 | 0.40 | 0.30 | 0.30 | 0.32 |
| 5:1 | 0.41 | 0.29 | 0.30 | 0.41 |
| 6:1 | 0.53 | 0.46 | 0.49 | 0.46 |

*on weight of paper
[1] mixture of Ex. 4

While the invention has been described with particular reference to specific embodiments, it is to be understood that it is not to be limited thereto but is to be construed broadly within the scope and extent of the appended claims.

What is claimed is:

1. A water and oil-repellent composition containing a solvent and Werner type complexes prepared by reacting trivalent chromium with a mixture of
   a. a fluorinated acid of the type $R_fCOOH$, and
   b. a fluorinated acid of the type $R_fCH_2COOH$, wherein $R_f$ is a perfluoroalkyl group of 3 to 18 carbon atoms and the mole ratio of chromium to acid types a and b is between 2:1 and 4:1, said composition containing from 10 to 99 parts by weight of $R_fCOOH$ and correspondingly from 90 to 1 part by weight of $R_fCH_2COOH$.

2. The composition of claim 1 wherein $R_f$ is a perfluoroalkyl group of 6 to 12 carbon atoms.

3. The composition of claim 1 wherein the fluorinated constituent of acid types a and b are of different chain lengths.

4. The composition of claim 1 wherein the ratio between $R_fCOOH$ and $R_fCH_2COOH$ is not more than 9:1 by weight.

5. The composition of claim 4 wherein said ratio is not more than 4:1.

* * * * *